United States Patent [19]

Patrick et al.

[11] Patent Number: 5,956,463
[45] Date of Patent: Sep. 21, 1999

[54] AUDIO MONITORING SYSTEM FOR ASSESSING WILDLIFE BIODIVERSITY

[75] Inventors: Paul H. Patrick, Milton; Narayan Ramani, Mississauga; William G. Hanson, Islington; Ronald W. Sheehan, Acton, all of Canada; Robert L. Jennette, Edgewater, Md.

[73] Assignee: Ontario Hydro, Toronto, Canada

[21] Appl. No.: 08/726,425

[22] Filed: Oct. 7, 1996

Related U.S. Application Data

[63] Continuation of application No. 08/076,751, Jun. 15, 1993, abandoned.

[51] Int. Cl.$^6$ .............................. G10L 5/06; G10L 9/00
[52] U.S. Cl. ....................... 395/2.41; 395/2.55; 119/906
[58] Field of Search ................................ 395/2.41, 2.55; 119/906

[56] References Cited

U.S. PATENT DOCUMENTS

| | | |
|---|---|---|
| 4,415,979 | 11/1983 | Hernandez . |
| 4,509,151 | 4/1985 | Anderson ................................ 367/118 |
| 4,630,246 | 12/1986 | Fogler . |
| 4,806,931 | 2/1989 | Nelson . |
| 4,864,282 | 9/1989 | Toeg . |
| 4,864,297 | 9/1989 | Shaw et al. . |
| 4,876,721 | 10/1989 | Kerr et al. ................................ 358/56 |
| 4,895,025 | 1/1990 | Betts . |
| 4,897,878 | 1/1990 | Boll et al. ................................ 381/43 |
| 4,965,552 | 10/1990 | Price et al. . |
| 5,036,538 | 7/1991 | Oken et al. ................................ 381/43 |
| 5,168,471 | 12/1992 | Parra ........................................ 367/99 |
| 5,404,422 | 4/1995 | Sakamoto et al. ..................... 395/2.41 |

FOREIGN PATENT DOCUMENTS

| | | |
|---|---|---|
| A-58865/90 | 7/1990 | Australia . |
| 2089597 | 8/1994 | Canada . |
| 58-158736 | 9/1983 | Japan . |
| 3-276199 | 12/1991 | Japan . |
| 1044250 | 9/1983 | U.S.S.R. . |

OTHER PUBLICATIONS

See Attached European Search Report With Annex.
"Cepstral Analysis Technique for Automatic Speaker Verification" —Sadaoki Furui, *IEE Transactions, ASSP–29*, No. 2, Apr. 1981.
Trouichet, et al. ("Special Signature recognition with a view to counting acoustic events," Signal Processing V—Theories & Applications, Proc. of Eusipco–90, 5$^{th}$ European Signal Processing Conf., vol. 3, pp. 1643–1646.
Sung, et al. ("Birds World: A Coupled Artificial Neural Network and Expert System (Cannes) Architecture," Neural Networks, 1989 IEEE Int'l Conf., pp. II–584.

*Primary Examiner*—Allen R. MacDonald
*Assistant Examiner*—Robert Louis Sax
*Attorney, Agent, or Firm*—Ridout & Maybee

[57] ABSTRACT

The invention relates to an automated system for monitoring wildlife auditory data and recording same for subsequent analysis and identification. The system comprises one or more microphones coupled to a recording apparatus for recording wildlife vocalizations in digital format. The resultant recorded data is preprocessed, segmented, and analyzed by means of a neural network to identify the respective species. The system minimizes the need for human intervention and subjective interpretation of the recorded sounds.

30 Claims, 4 Drawing Sheets

FIGURE 4 ically used conventional analog recorders to collect the animal vocalizations, or calls, from a representative area. However, recorders for recording long term terrestrial data (beyond 12 hours) at multiple sites and having a wide bandwidth (up to 10 kHz) are relatively expensive. Furthermore, the analysis of the recordings has to be conducted by surveyors out of the field, which involves labour intensive analysis by biologists who are deprived of the benefit of being present in the physical environment when identifying the call.

AUDIO MONITORING SYSTEM FOR ASSESSING WILDLIFE BIODIVERSITY

This application is a continuation of application Ser. No. 08/076,751, filed Jun. 15, 1993 now abandoned.

FIELD OF THE INVENTION

This invention relates to an automated monitoring system for monitoring wildlife auditory data, thereby to obtain information relating to wildlife populations in a terrestrial environment.

BACKGROUND OF THE INVENTION

Prior to granting approval for proposed construction or development, government authorities are requiring more comprehensive studies on their potential impact on the natural environment. Consequently, the measurement of the effects of human intervention on the natural environment, particularly on populations of rare or endangered species of animals and on the diversity of animal species, is an important requirement.

Currently used wildlife monitoring schemes typically involve experienced terrestrial biologists or surveyors entering the environment to be monitored and making first hand auditory and visual inspections of the terrestrial environment. These manual inspections may be unsatisfactory for several reasons. First, manual inspections are labour intensive, may require large numbers of individuals in order to cover a sufficiently representative territory of the environment, and may therefore be very difficult to perform; if sufficient resources are not available the results obtained may not be reliable.

Second, manual inspections may require lengthy periods of time to complete. Typically, the environments to be monitored are remote from city centres and, the travelling time to and from the site may be substantial. At the site, surveyors must approach the environment with great care in order to avoid disrupting the terrestrial environment.

Third, manual inspections are limited in their scope, because they are usually restricted to daylight hours and, as a result, nocturnal species are not generally observed. Animals may also be visually obscured by forest vegetation, and some environments such as swamps and marshes may not be easily accessible.

Finally, the integrity of any measured data is subject to uncertainty and error due to the highly subjective nature of auditory and visual observations.

Automatic monitoring systems have been developed in order to perform the monitoring function of surveyors. These systems have typically used conventional analog recorders to collect the animal vocalizations, or calls, from a representative area. However, recorders for recording long term terrestrial data (beyond 12 hours) at multiple sites and having a wide bandwidth (up to 10 kHz) are relatively expensive. Furthermore, the analysis of the recordings has to be conducted by surveyors out of the field, which involves labour intensive analysis by biologists who are deprived of the benefit of being present in the physical environment when identifying the call.

The present invention overcomes the drawbacks associated with manual inspections by providing an automated system which permits the continuous recording of animal vocalizations with a minimum of disturbance to the terrestrial environment. The present invention also permits the monitoring of a significant area with minimum labour requirements, and reduces misidentification resulting from observer biases.

In order that the invention may be readily understood, preferred embodiments thereof will now be described, by way of example, with reference to the accompanying drawings.

DETAILED DESCRIPTION OF THE PREFERRED EMBODIMENTS OF THE INVENTION

Figure 1:
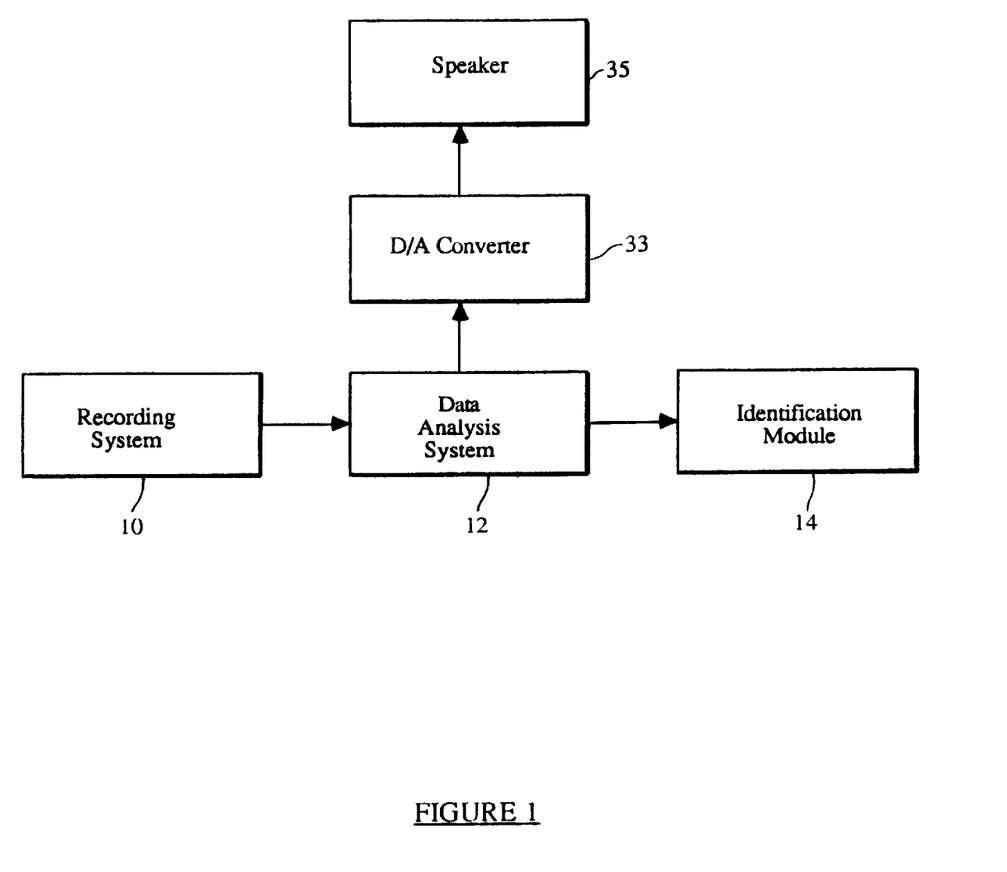
FIG. 1 is an overall schematic diagram of a wildlife vocalization identification system according to the invention.

As shown in FIG. 1, a recording system 10 is used to receive and record animal vocalizations from the terrestrial environment to be monitored. The vocalizations are then provided to a data analysis system 12 which analyzes the vocalizations. The data analysis system 12 also formats the vocalizations so that they may be processed by an identification module 14 which can identify the family, genus or the species of the animal from which a call originated. In addition, the data analysis system 12 can be used to calculate population estimates of the animals when the vocalizations are obtained from several, at least three, locations.

The data analysis system 12 may also be equipped with a digital-to-analog (D/A) converter 33 and a speaker 35 in order to enable surveyors or biologists to perform auditory identification of the signal as a verification of the results of the identification module 14.

Automated Recorder System

Figure 2:
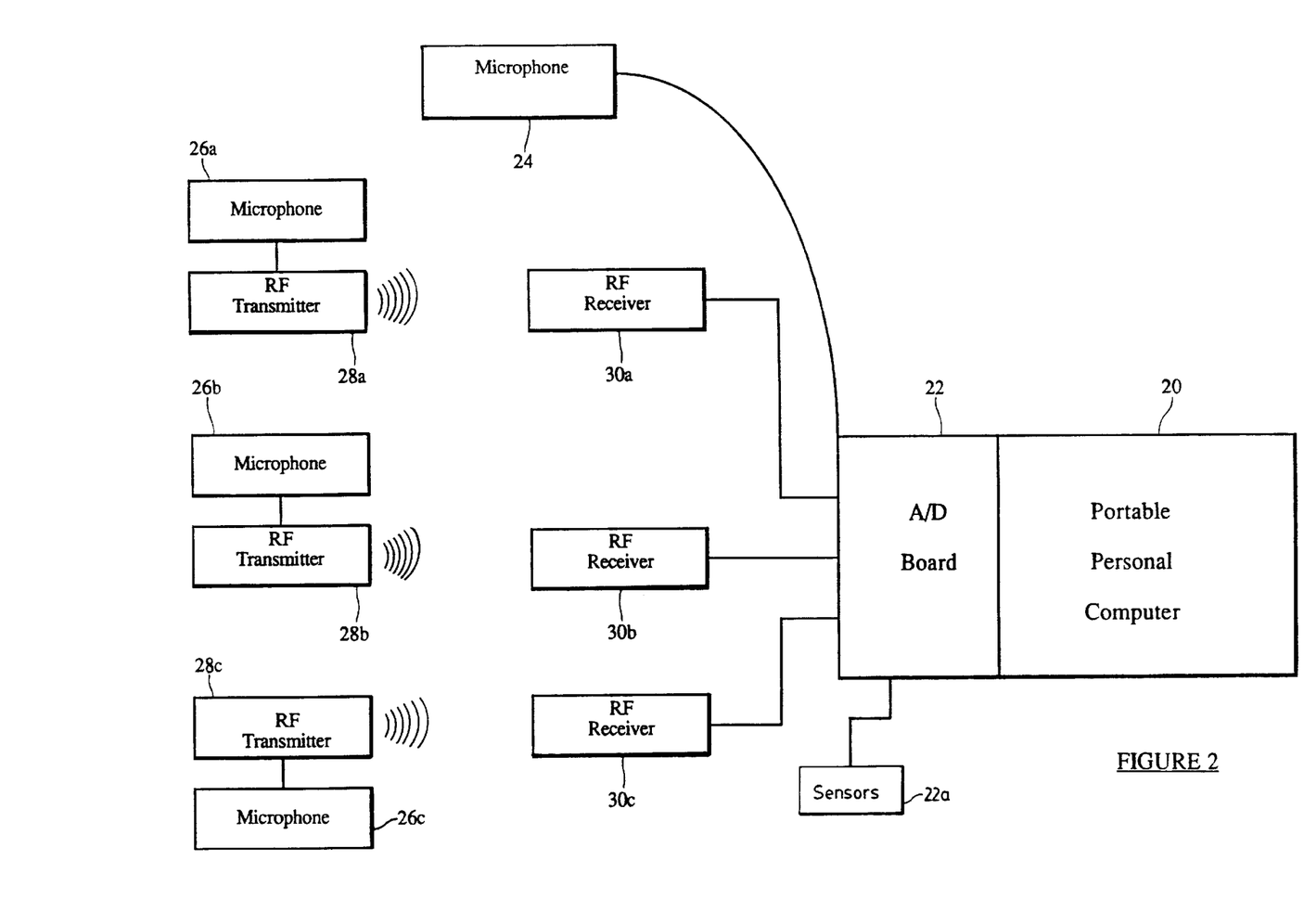
FIG. 2 is a schematic diagram of the recording system of FIG. 1.

The recording system 10 is an intelligent, multi-channel audio-band recorder. As shown in FIG. 2, this recorder consists of a conventional portable personal 16-bit computer 20 equipped with a 20 MHz internal clock and a 510 Megabyte hard disk. An analog-to-digital (A/D) board 22 having 16-bit resolution is connected to the computer 20. Microphones may be connected to the A/D board 22 using various communication links so that, for example, each channel has a bandwidth of 8 kHz, a dynamic range greater than 70 dB and a signal-to-noise ratio of 93 dB. One or more microphones 24 may be connected directly to the A/D board 22, the microphones being located so as to pick up the animal vocalizations from the selected environment. Alternatively, or in addition, microphones 26a, 26b and 26c located remotely from the A/D board 22 communicate with the A/D board by way of a radio frequency link. In this case the microphones 26a, 26b and 26c are coupled to radio frequency transmitters 28a, 28b and 28c operating on separate frequency channels. Separate channels on the A/D board 22 are connected to radio frequency receivers 30a, 30b and 30c, which are dedicated to the radio frequency transmitters 28a, 28b and 28c, respectively. It will be understood by persons skilled in the art that other techniques for transmitting signals from remote locations to the computer 20 may be employed. Furthermore, while the system is shown in FIG. 2 as having four microphones, it will be understood that one or more microphones located at various locations in the field may be used.

The acoustic data received by the microphones 24 and 26 is transmitted to the A/D board 22 where it is converted to digital form and stored on the hard disk associated with the computer 20. The computer 20 may be powered using a standard 120 volt AC supply, if available, or a 12 volt DC battery.

In order to conserve the limited storage space available on the hard disk of the computer 20, it may be necessary to minimize the recording of extraneous sounds, such as ambient background noise. Two techniques have been designed to achieve this purpose: time triggered recording and sound activated recording. With respect to the time triggered recording technique, the operator can predetermine the duration of the recording time of a collection period and the time interval between successive collection periods. Recordings can therefore range from continuous to discrete sampling periods. Discrete sampling periods allow the user to monitor the environment at times when the species being monitored are likely to be most vocal. All of the channels may be time triggered using the same or a different recording time and interval between collection periods. However, when the time triggered technique is used in association with the preferred embodiment described below all channels are time triggered simultaneously.

The sound activated recording technique provides a system that begins recording when triggered by an acoustic transient attaining a predetermined minimum amplitude. In the preferred embodiment, a transient received on one of the microphones 26 or 24 will cause the computer 20 to record the environment sounds received by all of the microphones whether or not a triggering acoustic transient is received by those microphones. Once the amplitude of the environmental sound falls below a threshold level on all four channels, the computer 20 ceases to record the environmental sounds. Between triggering transients, the computer transfers the data from its internal memory to the hard disk. The system records the time at which the triggering transient occurred in order to assist the analysis of the vocalizations. It will be understood by those skilled in the art, that the system may alternatively be designed so that the computer 20 will only record those channels receiving a triggering transient. In the latter case, only when the environmental sound received by the triggered individual microphone falls below a threshold will the computer cease recording on that channel. Alternatively, if desired, some of the channels may be time triggered and the others sound activated.

In an alternative embodiment of the invention, the recording system 10 consists of individual analog recorders situated in the field and interconnected so that they commence recording using either a time triggered technique or a sound activated technique. The recorders may commence recording either simultaneously or individually. A suitable commercially available time-triggered recorder is the SONY Professional Walkman Model WM-D6C. As mentioned above, the analog recorders are restricted in the length of real-time recording that can be made.

In each of the above embodiments, the recorder may be equipped with sensors 22a capable of collecting environmental data, such as temperature, humidity, barometric pressure and wind velocity, which can be related to the activity level of animals. For example, it is commonly known that amphibian vocalizations vary with temperature and humidity levels. The acoustic pressure level may be recorded, preferably at 2 second intervals for each channel during the period the computer is recording on the channel, using either the time triggered or the sound activated option. Information pertaining to the acoustic pressure level may be used to estimate the relative abundance of species, as will be discussed in more detail below.

Data Analysis

The data analysis system 12, consisting of a conventional personal computer and individual programs, is used to analyze the environmental sounds recorded by the recording system 10. As mentioned previously, the recording system 10 may be automated, such as the system described with reference to FIG. 2, or, alternatively, recordings may be made using standard analog recorders. In order for the environmental sounds to be analyzed by the identification module 14, they must first be formatted into digital data files. The sounds recorded by the automated recording system, shown in FIG. 2, are stored in a digital format on the hard disk of the computer 20. When analog recorders are used as the recording system 10, an A/D converter, connected to the analysis system's personal computer, is used to convert the analog recordings to digital files.

It is useful to analyze the digital files either prior to or while they are being processed by the identification module 14. Commercially available programs, for example ILS from Signal Technology Inc., Goleta, Calif., may be used to convert and compress the digital data files obtained using either the first or second preferred embodiment of the recording system to a uniform size without information loss. This conversion and compression facilitates further processing of the data. In order to provide biologists and scientists with an opportunity to review the details of particular vocalizations and verification of the identification of the vocalizations by the identification module, three types of files may be derived from the digital files and viewed:

(1) spectrograms, which identify the magnitude of the various frequencies for each time sequence;
(2) audiograms, which identify the frequencies of the time domain signal as a function of time; and
(3) time domain files, which identify the magnitude of the signal as a function of time.

These files may be further analyzed using commercially available programs in order to extract pertinent statistical information. The type of information that may be extracted from these files and which is useful for analyzing the vocalizations include:

(a) the average strength of all the frequency components at a particular time as a function of time;
(b) the strength of the dominant frequency at a particular time as a function of time; and
(c) the standard deviation for the portion of the signal containing ambient noise and the portion of the signal containing the call.

Additional programs to facilitate processing of the signals by the identification module 14 may be provided to perform the following functions:

(a) detecting the signal of interest using the standard deviation of the signal;
(b) filtering audiograms so as to eliminate ambient noise or separate simultaneous calls from species having calls of different frequencies; and
(c) smoothing the audiogram and time domain files by averaging.

Identification System

Figure 3:
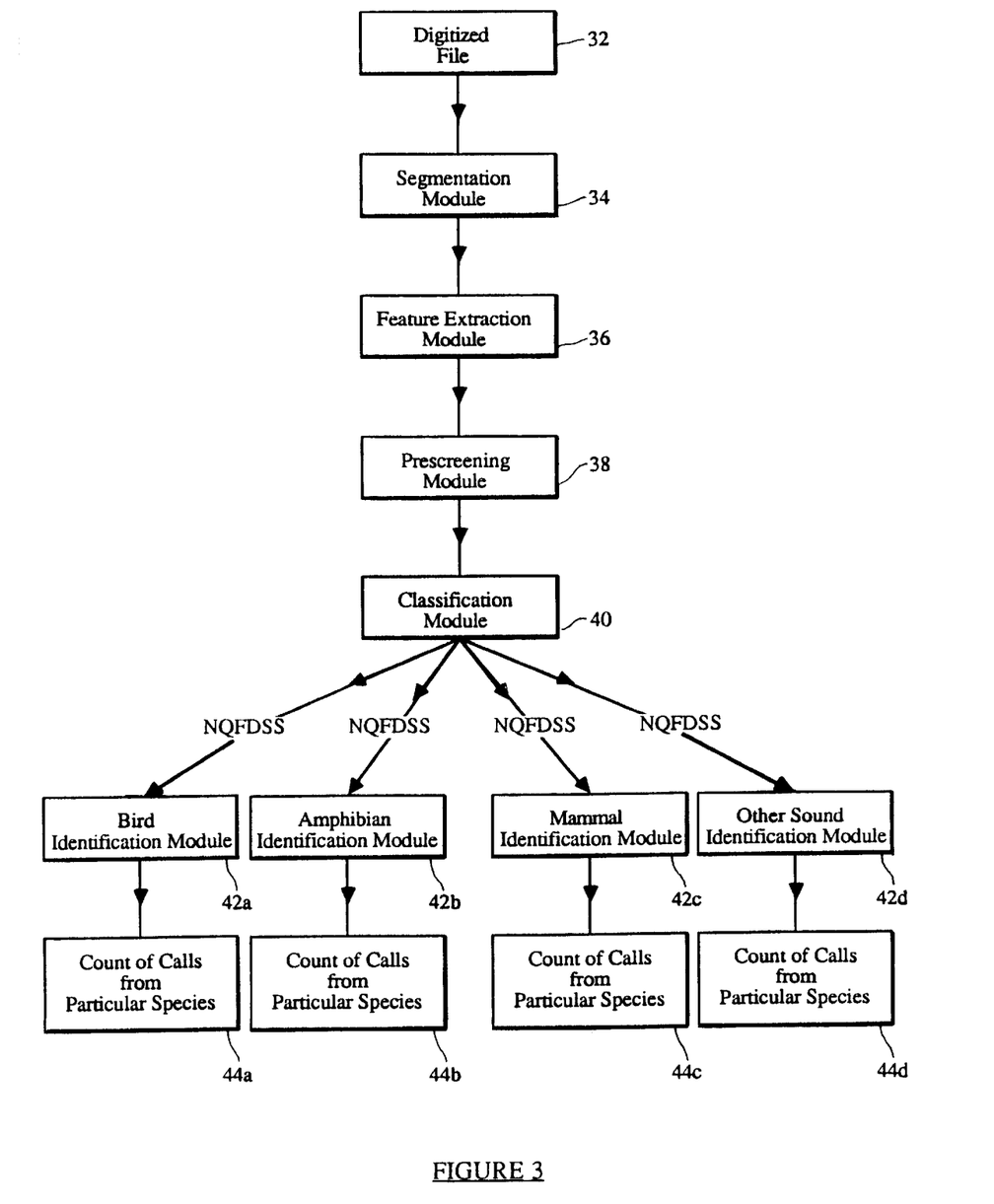
FIG. 3 is a schematic diagram of the identification module of FIG. 1 according to one embodiment of the invention.

FIG. 3, illustrates the organization of the identification module 14. It will be understood by those skilled in the art that the configuration of the system may be adapted to specific applications, for example, monitoring only the vocalizations of birds, or amphibians, or both amphibians and birds, etc.

The identification module 14 is used to discriminate wildlife calls and to identify the animal from which a selected call originated. Referring to FIG. 3, the digitized file 32 created by the data analysis system 12 is provided to a segmentation module 34. The segmentation module 34 is used to determine the commencement of a call in a vocalization. The digitized file 32 is then provided to a feature extraction module 36. The feature extraction module 36 generates a set of numerically quantized features of the digitized sound segments (NQFDSS). The sound segments (NQFDSS) characterize the signal according to certain features of the signal. A prescreening module 38 is used to eliminate extraneous vocalizations prior to the identification stage. The NQFDSS are then provided to individual classification modules 40. The classification modules 40 are comprised of neural networks which receive as inputs the NQFDSS and classify the animal vocalizations at their outputs. As shown in FIG. 3, the classification module 40 may further classify the signal into four sub-classification modules 42a, 42b, 42c and 42d, namely a bird identification module, amphibian identification module, mammal identification module and any another sound identification module. These sub-classification modules 42 are comprised of neural networks. The sub-classification modules 42a, 42b, 42c and 42d classify the signals provided thereto into the particular species and record the number of calls 44a, 44b, 44c and 44d identified for each species.

The individual components of the identification system will now be described in greater detail.

Segmentation Module

The segmentation module 34 receives the digitized file 32 and processes the data so as to discriminate the commencement of a call from background noise. The processing function of the segmentation module 34 may be performed by a program implemented by a conventional personal computer. In the preferred embodiment, the segmentation module 34 receives a digitized file 32 containing input points, in which 20,000 points correspond to one second of analog realtime sound. The segmentation module 34 scans 20,000 input points at a time and divides them into 625 segments each containing 32 points. The acoustical energy in each 32-point segment is calculated and compared with a previously determined threshold value. The threshold value for the acoustical energy is of the same order as but larger than the numerical representation of the acoustical energy in a 32-point segment of the ambient background noise at the site being monitored. The segment of ambient background noise may be recorded by the user when the recording system 10 is set up in the field. Alternatively, the computer 20 described with reference to the embodiment of FIG. 2 may be programmed to record the ambient noise level at regular intervals in order to account for changes in weather conditions or noise caused by animal and/or human activity.

The program searches the 625 segments in order to locate five contiguous segments which exceed the threshold value of the acoustical energy. If all the 625 segments have an acoustical energy greater than the threshold, the entire set of 20,000 points is forwarded to the feature extraction module 36. Otherwise, when five contiguous segments have been located, the beginning of the first segment of the first five contiguous segments that exceed this threshold is identified as the beginning of the call, to be forwarded to the feature extraction module 36. Once five contiguous segments are located, 20,000 points beginning with the first contiguous segment are provided to the feature extraction module 36.

If none of the 32-point segments has an acoustical energy greater than the threshold factor, a new threshold is determined by calculating the value obtained by taking 2% of the acoustical energy in the segment of the 625 segments containing the maximum amount of acoustical energy. The segmentation module 34 then repeats the same procedure on the 625 segments containing the maximum amount of acoustical energy.

It will be understood by those skilled in the art that the specific lengths of time, the number of points in each segment and the number of segments used for decision criteria and other values are exemplary only for purposes of description of the preferred embodiment and that these values are not necessarily appropriate for all monitoring situations. Furthermore, persons skilled in the art will also understand that the present invention is not limited to the segmentation procedure described above and contemplates any procedure which is capable of isolating a call.

Feature Extraction Module

The feature extraction module 36 produces a set of coefficients, referred to as NQFDSS, which characterize a particular characteristic of the digitized file 32. The feature extraction module 36 receives the digitized file 32 from the segmentation module 34. The feature extraction module 34 may characterize the digitized file 32 in several ways, for example using mel bins, cepstrum coefficients, linear predictive coefficients or correlation coefficients. The feature extraction module 36 only processes the first 11,264 points (352 segments) from the beginning of the vocalization identified by the segmentation module 34. The 11,264 points are processed 2,048 points at a time with a 1,024 point overlap. The first set of points starts at the first point and ends with point 2,048. These points are isolated by means of a Welch window, the procedure for which is described in Press, et al. (Numerical Recipes in C, Cambridge University Press, 1988), the contents of which are hereinafter incorporated by reference. If the feature extraction module 36 characterizes the digitized file 32 using mel bins, the Fast Fourier transform (FFT) and the power spectrum of the windowed set of points is calculated. The frequency axis is then divided into 18 segments each 20 mels in width. The 18 areas in these 18 segments of the power spectrum are extracted and saved.

The second set of 2,048 points starts with point 1,025 and ends with point 3,072. These points are processed according to the same procedure for the first set and a further 18 numbers are extracted. This procedure is continued until all of the 11,264 points have been processed (10 sets of 2,048 points) and 180 power spectrum numbers grouped into mel bins have been extracted.

Alternatively, a feature extraction module 36 may be used which characterizes the digitized file 32 using cepstrum coefficients. In order to characterize using cepstrum coefficients, the feature extraction module also uses the first 11,264 points of the vocalization, which are divided into 10 overlapping sets of 2,048 points each. Each of the sets is windowed using a Welch window. Each of the sets is processed so as to produce 24 cepstrum coefficients for each set. Cepstrum coefficients are used to characterize the speaker's vocal chord characteristics. The procedure for deriving the cepstrum coefficients for each set is found in S. Furui, Cepstral Analysis Technique for Automatic Speaker Verification, IEEE Transactions on Acoustics, Speech and Signal Processing, Vol. ASSP-29, No. 2, April 1981, pages 254–272, the contents of which are hereinafter incorporated by reference. The NQFDSS for the second module are composed of 240 cepstrum coefficients.

The procedures for characterizing the digitized file 32 using either linear predictive coefficients or correlation coefficients are described in S. Furui, Cepstral Analysis Technique for Automatic Speaker Verification, IEEE Transactions on Acoustics, Speech and Signal Processing, Vol. ASSP-29 No. 2, April 1981, pages 254–272. It will be understood by a person skilled in the art that there are additional alternative ways of characterizing the digitized file 32.

Prescreening Module

The NQFDSS derived by the feature extraction module 36 are provided to a prescreening module 38. The prescreening module 38 is designed to screen out extraneous vocalizations prior to the identification stage. This screening out process improves the reliability and efficiency of the identification stage.

The design process for the prescreening module 38 is similar to an unsupervised clustering process based on Euclidean distance, which is described in Y. Pao, Adaptive Pattern Recognition and Neural Networks, Addison-Wesley, 1989, the contents of which are hereinafter incorporated by reference. The NQFDSS of a set of identified training sample calls are obtained from the feature extraction module 36. The NQFDSS are then normalized in the range 0 to 1. The training samples are then processed to determine the clusters according to the following sequence of steps:

1. n=1
2. cluster 1=training sample 1
3. Increment n
4. Stop if n>number of training samples
5. Find cluster i, that is closest to training sample n.
   If the Euclidian distance is greater than a threshold (for example, 2.5), create a new cluster i+1=sample n.
   Else, add sample n to cluster i and adjust cluster i such that it is at the centroid of all the samples in that cluster.
6. Go to step 3.

Once the prescreening module 38 has been designed, any sample that is outside the specified distance from all the clusters is termed "unknown" and is discarded prior to the identification range.

Classification Module

The classification module consists of a multilayer, fully connected, feedforward perceptron type of neural network such as described in McClelland J. L. et al. Parallel Distributed Processing, Vol. 1, MIT Press, 1986, the contents of which are hereinafter incorporated by reference. In the preferred embodiment, each neural network consists of an input layer, an output layer and a single hidden layer. The number of neurons in the input layer corresponds to the number of NQFDSS provided by the feature extraction module 36. Accordingly, 180 neurons are used in the input layer of the classification module 40 when the segmented signal is characterized by the feature extraction module 36 using mel bins and 240 neurons are used in the input layer when the segmented signal is characterized using cepstrum coefficients. The number of output neurons in the output layer corresponds to the number of possible categories into which the segmented signal, or vocalization, may be classified. The classification module in FIG. 3 would have four neurons in the output layer corresponding to the four possible classifications. The number of hidden layers and the number of neurons in each hidden layer is determined empirically in order to maximize performance on specific types of sounds being monitored. However, for a particular application of the system described, one hidden layer containing 20 neurons is used. In each layer the neurons provide outputs between 0 and 1.

In the present embodiment, in the training phase of the neural network, the interconnection strengths between neurons are randomly set to values between +0.3 and −0.3. A test digitized file is provided to the segmentation module 34. The NQFDSS derived from the feature extraction module 36 are normalized to values between 0 and 2 and are used as inputs to each of the input neurons. The network is trained using a back propagation algorithm such as described in the afore-mentioned paper of McClelland et al. The learning rate and momentum factor are set to 0.01 and 0.6, respectively. The training process is carried out until the maximum error on the training sample reaches 0.20 or less (the maximum possible error being 1.0). In other words, training continues until the activation of the correct output neuron is at least 0.8 and the activation of the incorrect output neurons is less than 0.2.

In order to classify a call, the NQFDSS for the call are provided to the input neurons of the classification module 40. Only when the responses of all the output neurons are less than a specified value V1 (for example, where V1 is less than 0.5) with the exception of one output neuron whose response is above a specified value V2 (for example, where V2 is greater than 0.5) is the network deemed to have made a classification of the call into the family 42 corresponding to the output neuron having the output greater than V2. When a response other than the foregoing is obtained, the classification network is deemed to be undecided.

It may be desirable to classify further the NQFDSS into the specie of the animal from whom the call originated. As shown in FIG. 3, each family identification module 42a, 42b, 42c and 42d may be further classified to determine the number of calls recorded which originated from a particular species 44. Each of the identification modules 42a, 42b, 42c and 42d include a neural network similar to the neural networks described with reference to the classification module 40. However, the number of neurons in the output layer of the identification modules 42a, 42b, 42c and 42d would correspond to the number of species to be identified by each family identification module 42. When the classification module 40 identifies one of the family identification modules 42a, 42b, 42c or 42d, the NQFDSS are then provided to the input layer of the identified family classification module. In the identified classification module, the neuron in the output layer corresponding to the animal species which originated the call will respond with an output greater than V2.

It will be apparent to a person skilled in the art that further classification schemes are possible in order to more efficiently and reliably classify vocalizations. For example, the bird identification module may correctly identify the majority of vocalizations but inconsistently identify a subgroup of birds which contains species A, B, C and D. The network may be retrained to place calls of all birds of this subgroup into a single identification category and forward the appropriate set of NQFDSS to another identification module which has been specifically trained to identify species of this subgroup from calls presented to it from this subgroup only.

Figure 4:
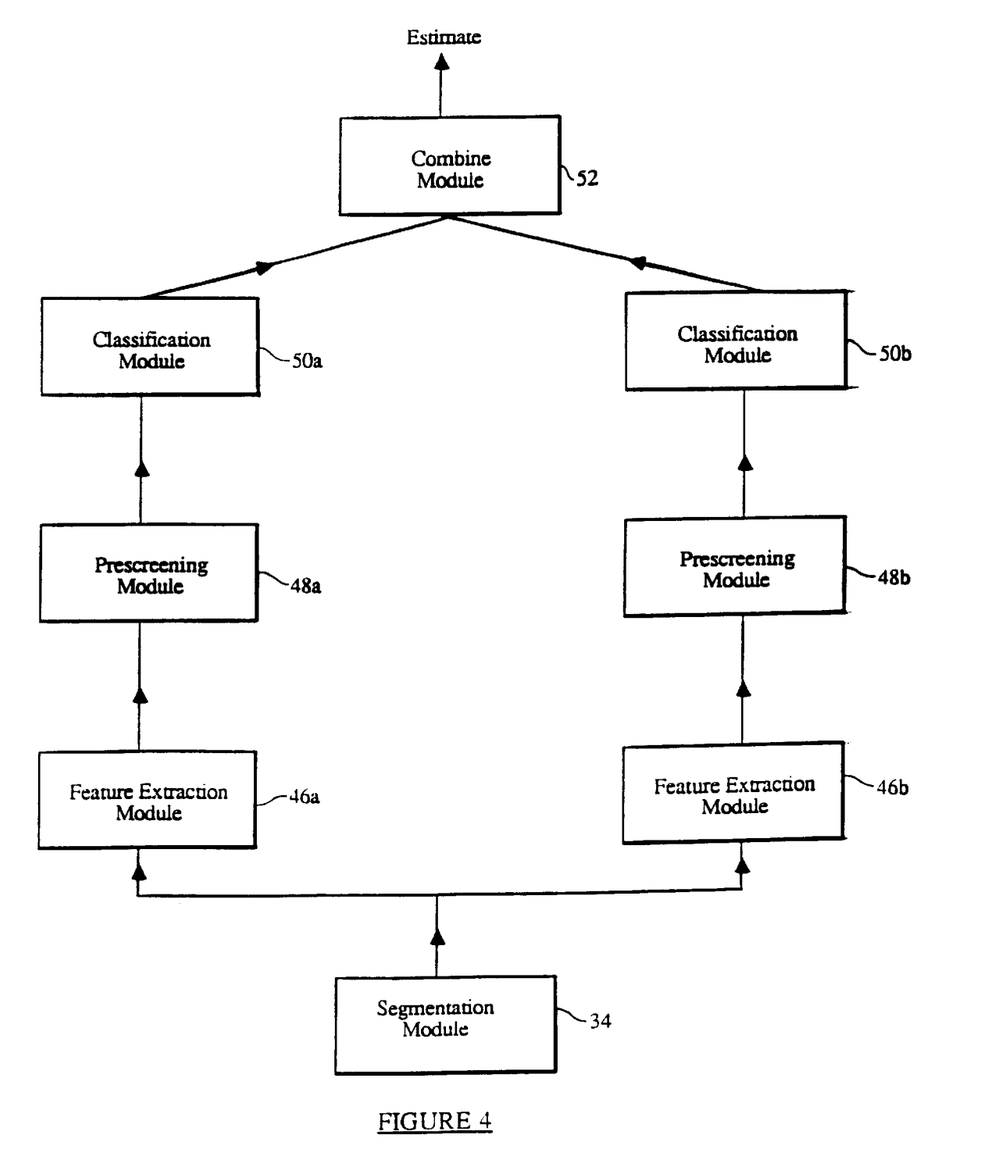
FIG. 4 is a schematic diagram of the identification module of FIG. 1 according to a second embodiment of the invention.

In order to improve the reliability of the identification module 14, a system which combines the outputs of two or more neural networks analyzing the same signal has been designed. As shown in FIG. 4, the digitized file 32 is segmented by the segmentation module 34 and the digitized file 32 is then provided to two feature extraction modules 46a and 46b. Each feature extraction module 46a and 46b characterizes the digitized file 32 using a different technique, for example mel bins and cepstrum coefficients. The NQFDSS generated by each feature extraction module 46a and 46b are respectively provided to a prescreening module 48a and 48b and classification module 50a and 50b. The feature extraction modules 46a and 46b, prescreening modules 48a and 48b, and classification modules 50a and 50b function in the same way as the equivalent modules in FIG. 3.

In a system having two classification modules 50a and 50b, such as shown in FIG. 4, there are four possible results: (a) both classification modules 50a and 50b may make the same classification; (b) one module makes a definite classification while the other module is undecided; (c) both modules are undecided; or (d) both modules may make conflicting classifications. A combine module 52 is used to rationalize the possible outputs from the classification modules 50a and 50b. There are several techniques that may be used by the combining module 52 for combining the results from each module 50a and 50b and thereby improving the efficiency of the results obtained by either individually. According to one such technique, when result (a) is obtained, the classification made by both modules is accepted as correct; when result (b) is obtained, the definite classification is accepted as correct; and when results (c) and (d) are obtained, the particular sound is tagged for possible future review by a human auditor and no conclusion is reached.

An alternative technique that may be used by the combining module 52 involves averaging the response obtained for each output neuron from one classification module with the response from the corresponding neuron output from the other classification module(s). This technique is most suitable when neuron responses range between 0.3 and 0.7 and where there are more than two classification modules to be combined.

The classification derived by the combine module 52 may be further subclassified for example as is shown in FIG. 3.

In another aspect, the present invention also provides for the estimation of the relative abundance of species in a terrestrial environment. A multi-channel recording system is used to record environmental sounds containing vocalizations. The microphones associated with the recorder are positioned at three or more discrete sampling locations in a triangular scheme whereby a vocalization in the vicinity of one microphone can also be detected by the remaining microphones. The microphones record simultaneously using either the time triggered technique or the voice activated technique. The amplitude of sound recorded by each of the microphones will vary depending on the position of the microphone with respect to the animal or animals from whom the call or calls originated.

It will be appreciated that the specific embodiments described above can be varied in numerous ways to suit particular requirements without departing from the scope of the invention. For example, the system can be modified for use in monitoring wildlife auditory data in an aquatic environment, hydrophones being used in place of microphones.

We claim:

1. A method for assessing biodiversity in an environment, said method comprising the steps of:

obtaining vocalizations from a plurality of locations in the environment;

deriving auditory data from the vocalizations for each of said locations;

recording the auditory data in digital format;

processing the recorded data for each of said locations;

identifying predetermined characteristics of the processed data to identify the wildlife species from which the vocalizations are derived for each of said locations;

quantifying the wildlife species identified at each of said locations; and assessing the biodiversity of the environment on the basis of the number of wildlife species identified.

2. The method for assessing biodiversity according to claim 1, further including the step of determining identified members of a wildlife species which move from one of said locations to another of said locations, so that the identified member is counted once in the quantification step.

3. An automated system for assessing biodiversity in an environment, said system comprising:

means for receiving vocalizations from a plurality of locations in the environment;

means for deriving auditory data from the vocalizations for each of said locations;

means for recording the auditory data in digital format;

means for processing the recorded data for each of said locations;

means for identifying predetermined characteristics of the processed data thereby to identify the wildlife species from which the vocalizations are derived for each of said locations;

means for quantifying the wildlife species identified at each of said locations and means for assessing the biodiversity of the environment on the basis of the identified wildlife species.

4. The automated system for assessing biodiversity according to claim 3, wherein said receiving means comprises at least one microphone located at each of said locations and coupled to the recording means.

5. The automated system for assessing biodiversity according to claim 4, wherein at least three locations are selected for the environment of interest and each of said locations includes at least one microphone, said microphone being coupled to said recording means.

6. The automated system for assessing biodiversity according to claim 4, wherein said recording means is time-triggered to record the auditory data at successive discrete intervals.

7. The automated system for assessing biodiversity according to claim 3, wherein said identifying means comprises:

(a) means for determining the commencement of a vocalization in said recorded auditory data;

(b) means for characterizing a received vocalization into a set of numerically quantized features of said vocalization using a characterizing technique; and (c) means for classifying the vocalization according to said numerically quantized features.

8. The automated system for assessing biodiversity according to claim 7, wherein said means for assessing the biodiversity includes means for detecting members of an identified wildlife species moving from one of said locations to another of said locations.

9. An automated monitoring system for monitoring wildlife vocalizations comprising:
   means for receiving and deriving auditory data from said vocalizations,
   means for recording the auditory data in digital format,
   means for processing the recorded data,
   means for identifying predetermined characteristics of the processed data thereby to identify the wildlife species from which the vocalizations are derived, and
   said means for identifying including means for determining the commencement of a vocalization in said recorded auditory data means for characterizing a received vocalization into a set of numerically quantized features of said vocalization using a characterizing technique, and means for classifying the vocalization according to said numerically quantized features.

10. An automated monitoring system according to claim 9, wherein said receiving means comprise at least one microphone connected directly to the recording means.

11. An automated monitoring system according to claim 9, wherein said receiving means comprise at least one microphone coupled to the recording means by a radiofrequency link.

12. An automated monitoring system according to claim 9, wherein said receiving means comprise at least three microphones located at different locations and coupled to the recording means by radiofrequency links defining respective receiving channels.

13. An automated monitoring system according to claim 9, wherein said recording means comprises an analog-to-digital converter connected to a personal computer.

14. An automated monitoring system according to claim 13, wherein the personal computer includes a hard disk.

15. An automated monitoring system according to claim 9, wherein said recording means is time-triggered to record the auditory data at successive discrete intervals of equal duration.

16. An automated monitoring system according to claim 9, wherein said recording means is sound-activated to record the auditory data at successive discrete intervals of equal duration.

17. An automated monitoring system according to claim 9, further comprising means for sensing environmental data, said recording means being adapted to record the environmental data in digital format.

18. An automated monitoring system according to claim 17, wherein said sensing means are temperature, barometric pressure and wind velocity sensors.

19. An automated monitoring system according to claim 9, wherein said processing means for processing the recorded data comprises means for formatting the data into digital data files and means for compressing the digital data files to a uniform size without information loss.

20. An automated monitoring system according to claim 19, wherein said processing means further comprises means for deriving from the recorded data spectrograms, audiograms and time domain representations.

21. An automated monitoring system according to claim 20, wherein said processing means further comprises means for deriving from the recorded data
   (i) the average strength of all the frequency components at a particular time as a function of time,
   (ii) the strength of the dominant frequency at a particular time as a function of time, and
   (iii) the standard deviation for the portion of the auditory data containing noise and the portion of the auditory data representing the vocalization.

22. An automated monitoring system according to claim 20, wherein said processing means further comprises:
   (a) means for detecting a vocalization using the standard deviation of said digitally recorded received sounds;
   (b) means for filtering said audiogram so as to eliminate ambient noise or separate simultaneous vocalizations from species having vocalizations of different frequencies; and
   (c) means for smoothing said audiogram and said time domain representation by averaging.

23. An automated monitoring system according to claim 9, further comprising a digital-to-analog converter connected to said processing means for converting said digitally recorded received sounds to analog form, and a speaker connected to receive said converted sounds thereby to enable auditory verification of the results of said identifying means.

24. An automated monitoring system according to claim 9, wherein said means for determining the commencement of said vocalization performs the following steps:
   (a) dividing the digitally recorded data into a plurality of segments;
   (b) calculating the acoustical energy of each segment;
   (c) comparing the acoustical energy of each segment with a predetermined threshold value; and
   (d) locating a predetermined number of contiguous segments whose acoustical energy exceed said threshold value.

25. An automated monitoring system according to claim 9, wherein said characterizing means characterizes said recorded auditory data using mel bins, cepstrum coefficients, linear predictive coefficients or correlation coefficients.

26. An automated monitoring system according to claim 9, wherein said classifying means comprises a neural network.

27. An automated monitoring system according to claim 26, wherein the neural network is a multilayer fully connected feed forward perception type having an input layer, an output layer and at least one hidden layer.

28. An automated monitoring system according to claim 27, wherein the number of output neurons in said input layer corresponds to the number of numerically quantized features in said set and the number of neurons in the output layer corresponds to the number of possible classifications for said vocalization.

29. An automated monitoring system according to claim 28, wherein the activation of each output neuron in said output layer identifies a further sub-classification neural network which has an input layer which receives said numerically quantized features and an output layer having a neuron for each possible classification for said vocalization.

30. An automated monitoring system according to claim 29, further comprising a successive classification neural network for use in further classifying said vocalization.

* * * * *